United States Patent [19]

Bixby

[11] 4,322,752

[45] Mar. 30, 1982

[54] FAST FRAME RATE SENSOR READOUT

[75] Inventor: James A. Bixby, San Diego, Calif.

[73] Assignee: Eastman Technology, Inc., Rochester, N.Y.

[21] Appl. No.: 112,483

[22] Filed: Jan. 16, 1980

[51] Int. Cl.³ .............................................. H04N 3/14
[52] U.S. Cl. ................................................... 358/213
[58] Field of Search ....................... 358/43, 50, 48, 44, 358/212, 213; 357/24, 30; 250/208, 209, 211 R, 211 J

[56] References Cited

U.S. PATENT DOCUMENTS 4,117,510  9/1976  Ohta et al. ............................ 358/44
4,212,034  7/1980  Kokie et al. ........................ 358/213

OTHER PUBLICATIONS

Jespers et al, "Three Terminal C.I.D. Devices", Nato Advanced Institute on Solid State Imaging, 1975.
Jespers et al, "Three Terminal Charge-Injection Device", IEEE Journal of Solid State Circuits, vol. SC-11, No. 1, Feb. 1976, pp. 133-139.
Jespers et al, "A Three-Terminal Charge-Injection Device", 1975 IEEE International Solid State Circuits Conference, pp. 28-29.
Sequin et al, Charge Transfer Devices, Academic Press, 1975, pp. 152-157.
Hobson, Charge-Transfer Devices, John Wiley and Sons, (Halsted Press), 1978, pp. 169-172.

Primary Examiner—John C. Martin
Attorney, Agent, or Firm—Robert F. Cody

[57] ABSTRACT

Prior art electronic cameras that use solid state area image sensors are generally limited to operation at frame rates less than about 120 frames per second. Such frame rates are limited, principally, by the maximum data rate at which solid state sensors may be operated. The present invention provides methods and apparatus for readout of an area image sensor at greatly increased frame rates, doing so by formatting the sensor into blocks of photosite rows for purposes of readout, and by modifying the method of sensor readout in a manner compatible with such format.

17 Claims, 9 Drawing Figures

LINE TRANSFER

FRAME TRANSFER

INTERLINE TRANSFER

FAST FRAME RATE SENSOR READOUT

FIELD OF THE INVENTION

The present invention relates to area image sensors and, more particularly, to methods and apparatus for readout of solid-state area image sensors at fast frame rates.

DESCRIPTION RELATIVE TO THE PRIOR ART

The use of solid-state area image sensors in video cameras has become increasingly popular in recent years. Such cameras are lighter, more compact and more reliable than their "tube-type" counterparts that use vidicons, orthicons or other electron tube devices for image sensing. The solid-state sensors presently available for use in video cameras provide acceptable resolution and are readable at the standard video frame rate of 30 frames per second.

A typical solid-state area image sensor is comprised of an array of charge-integrating photosites (e.g., photocapacitors, photodiodes, etc.) arranged in rows and columns. Each photosite responds to incident radiation to provide a signal corresponding to one picture element (pixel) of frame information. Such sensors are generally read out a line at a time by one of three generally known methods of serial line readout: (1) According to the line transfer method of sensor readout (see FIG. 1a), clock pulses from a line address circuit cause lines of image information to be sequentially transferred to an output register. Readout of the output register is synchronized with the line transfer of image information to provide a line sequential video output signal. (2) In the frame transfer approach (see FIG. 1b) an accumulated charge pattern for an entire frame (or field) is periodically shifted into a storage area. The charge pattern residing in the storage area is then transferred a line at a time into a readout register from which a video output signal is taken. (3) In the interline transfer method (see FIG. 1c), a charge pattern is accumulated at integration sites and then periodically transferred into storage columns. The transferred charge is then shifted, a line at a time, into a readout register from which a line-by-line video output signal is taken. These prior art readout schemes are discussed in more detail in Hobson, "Charge-Transfer Devices", published by Halsted Press, 1978, pages 169–172, and Sequin and Tompsett, "Charge Transfer Devices", published by Academic Press, 1975, pages 152–157.

Irrespective of which of the above-discussed serial line readout schemes is used for sensor readout, it is not feasible to read out a state-of-the-art, high resolution, solid-state area image sensor at high frame rates (i.e., above about 120 frames per second) because the data rate at which such solid-state sensors can be read out is limited to about 10 MHz. If one frame contains 60,000 pixels, for example, the maximum frame rate obtainable would be about 120 frames per second. At present, therefore, there are no video cameras using solid-state image sensors that operate at frame rates much in excess of 120 frames per second. For some applications, however, much faster frame rates are required. For example, recording the motion of a rapidly moving object requires a frame rate high enough to "freeze" the object; if the object is not "frozen", successive frames will tend to smear into each other. As will be appreciated, the required frame rate depends, in general, upon the particular application and the amount of image smear that can be tolerated. In certain industrial applications, such as recording a test car crash under simulated conditions, or the breaking of a bottle during a manufacturing process, frame rates as high as 2,000 frames per second, or more, are desired.

One possible approach to obtaining faster frame rates from an area image sensor is to read out all sensor lines simultaneously, i.e., in parallel. With parallel line readout, the time required to read out a frame of information roughly corresponds to the time required to read out a single line since all lines are read out simultaneously. A significant drawback of the parallel line method of readout, however, is that numerous individual "line" signals are produced that must be processed separately, but in a virtually identical manner. Such multi-signal processing is almost impossible (as a practical matter) in view of the fact that the levels of the signals to be processed may be quite low and the signals may have marginal signal-to-noise ratios. As a result, parallel line readout is generally limited to low resolution applications wherein only a relatively few lines of information are to be processed.

To summarize, inherent difficulties are encountered if one attempts to obtain "fast" frame rates from a current state-of-the-art area image sensor by using the serial line method of sensor readout; on the other hand, while "fast" frame rates are feasible using the parallel line method of sensor readout, the results are far from satisfactory because of the practical problems associated with the electronic processing of numerous parallel signals.

SUMMARY OF THE INVENTION

In accordance with the present invention, methods and apparatus are provided for reading out information from a solid-state area image sensor in a fraction of the time that would be required were the sensor read out according to any of the serial line readout methods discussed above. Further, by following the teaching of the invention, frame rates on the order of thousands of frames per second are obtainable without the need for processing numerous signals such as result from the parallel line method of sensor readout.

In a preferred embodiment wherein the photosites are arranged in rows and columns, the sensor is read out in "blocks" of photosites, with each block being comprised of a plurality of adjacent photosite rows. A block of photosites is enabled by the application of an enablement signal to the photosites within the block; and a column address signal is sequentially applied to the photosite columns to effect column-wise readout of the photosite rows within the enabled block. The output signal so produced is, therefore, comprised of block information in a "serial" format, while the information content of each block is comprised of a plurality of line signals in a "parallel" format, such line signals corresponding to the individual photosite rows within that block.

BRIEF DESCRIPTION OF THE DRAWINGS

In the detailed description of the preferred embodiments of the invention presented below, reference is made to the accompanying drawings, in which.

DETAILED DESCRIPTION OF THE PREFERRED EMBODIMENTS

Figure 1A:
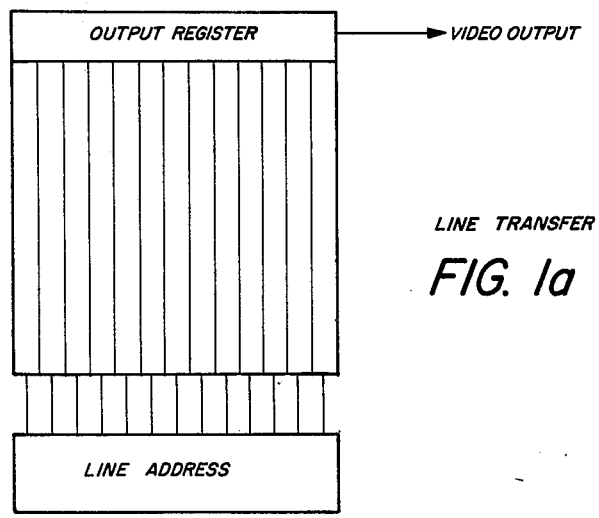
FIGS. 1a, 1b and 1c, discussed above, illustrate prior art serial line readout schemes for area image sensors.
Figure 1B:
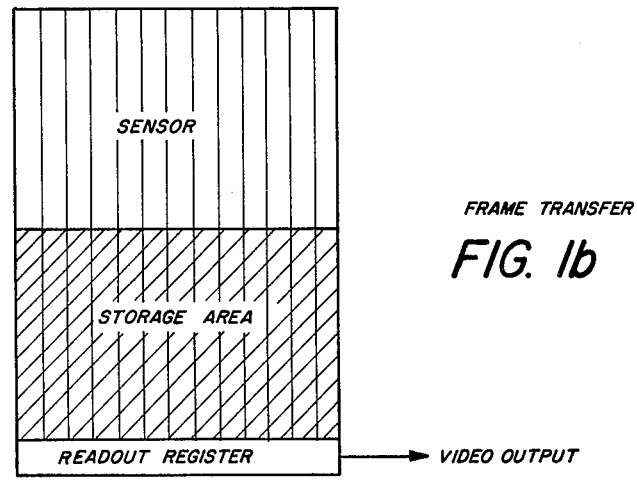
Figure 1C:
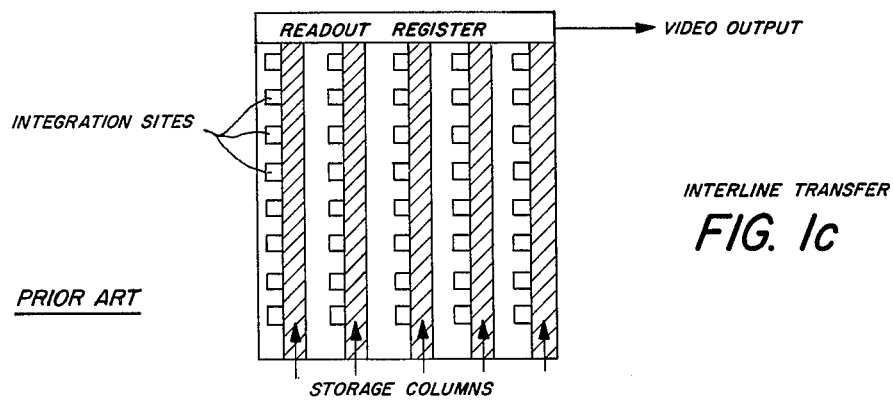
Figure 2:
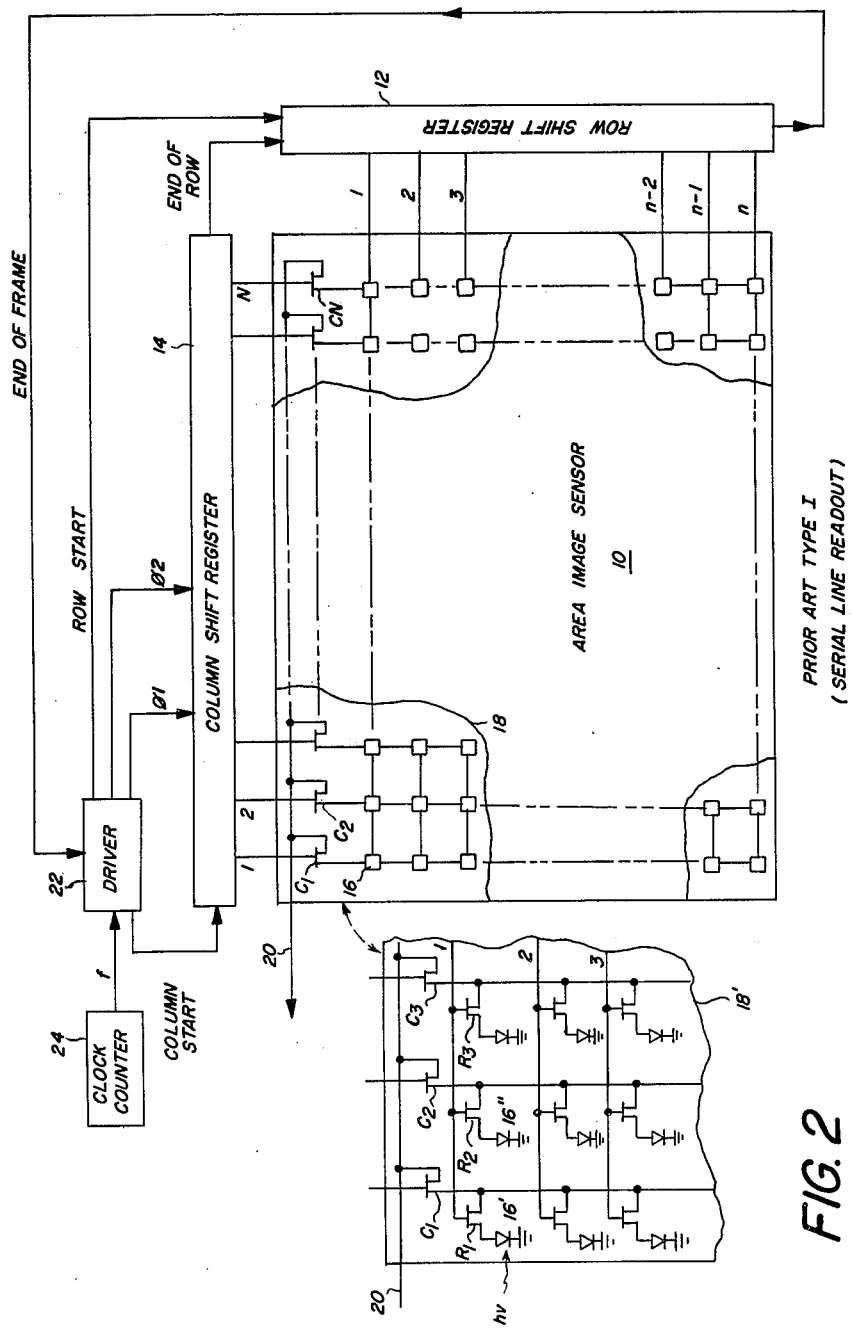
FIGS. 2 and 3 show specific types of area image sensors suitable for, respectively, serial line and parallel line readout.

While serial line and parallel line readout have been generally described above, it is helpful for purposes of understanding the invention to examine the serial line and parallel line readout processes in connection with specific types of area image sensors. FIG. 2 depicts a known type of area image sensor 10 suitable for serial line readout. Readout is initiated by the application of row and column start signals to row and column shift registers 12 and 14, respectively. The row shift register 12 enables individual rows of photosites 16 by closing gates R1, R2 . . . RN (See the schematic cutaway 18/18'), thereby allowing readout of the first photosite row upon column address, i.e., the sequential closing of gates C1, C2 . . . CN. Specifically, as the column start signal noted in FIG. 2 initiates address by the column shift register 14, gate C1 (shown as a field effect transistor) closes. With the gates R1, R2 . . . RN being also closed, the signal from the photosite 16' is applied to an output bus line 20 to yield one pixel of frame information. A pair of clocking pulses $\phi 1$ and $\phi 2$, produced by a driver 22 controlled by a clock 24, index the column address shift register 14 causing the next photosite 16" in row 1 to be addressed (by closing gate C2). Column address continues until all photosites in row 1 have been addressed, thereby producing one line of frame information (corresponding to row 1 of the area image sensor 10). An "end of row" pulse then sequences the row shift register 12 causing it to enable the second row of photosites. A column start pulse then initiates column readout of the photosites within row 2 to provide a second line of frame information. This process continues until all photosites in the area image sensor 10 have been read out, resulting in an output signal which constitutes a frame (or field) of image information in a serial line format. An "end of frame" signal from the row shift register 12 resets the driver 22 for readout of the next frame.

Figure 3:
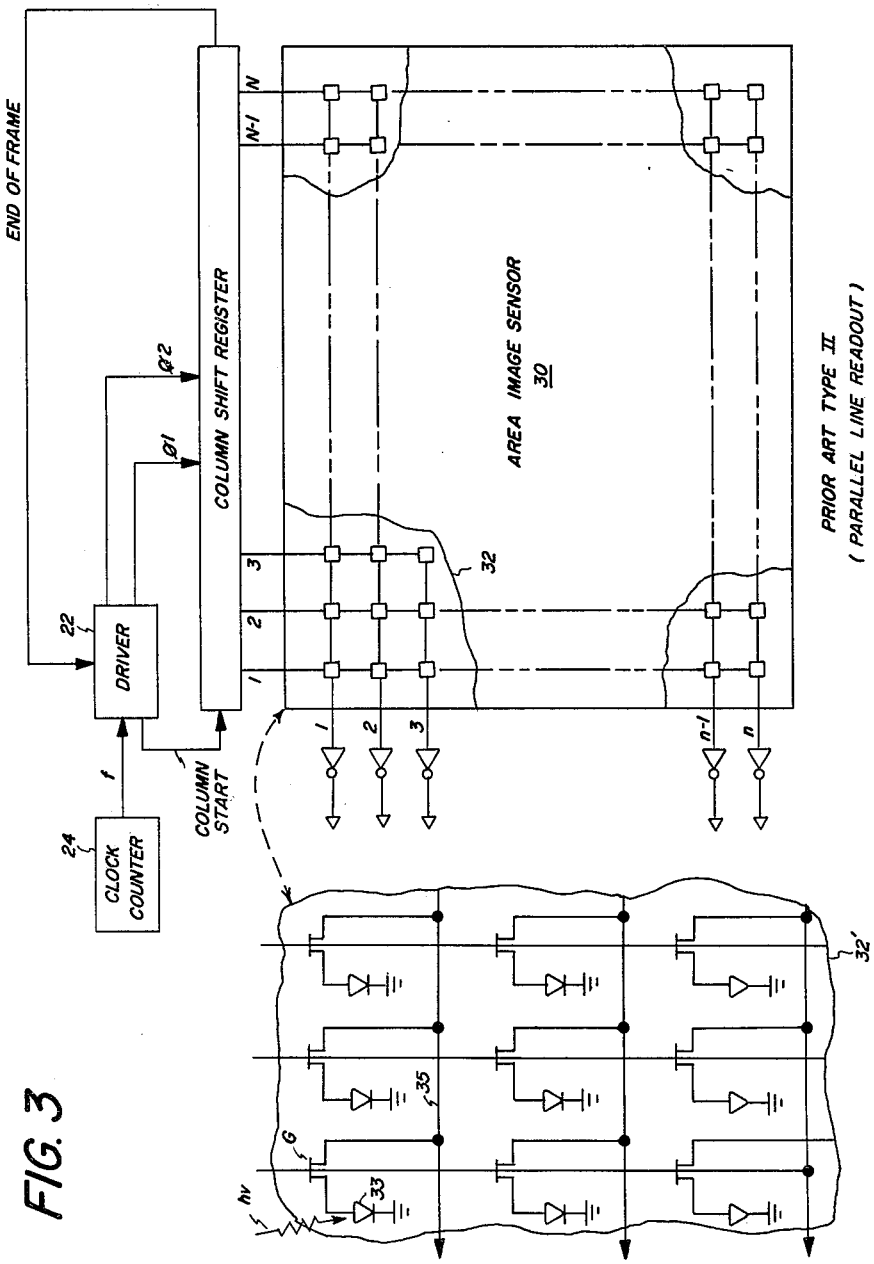

Reference should now be had to FIG. 3 which shows an area image sensor 30 wherein the lines of frame information are read out in parallel (as opposed to the serial line readout method described above). Looking first at the electrical schematic diagram 32' of a portion 32 of the area image sensor 30, each photosite thereof contains only a single gate G between a photosensitive element 33 and an output bus line 35. Further, because all gates G within a column are electrically connected, they are addressed together. As a result, column readout (which proceeds in a manner similar to that already described in detail in connection with FIG. 2) of all n rows of the sensor 30 is performed simultaneously. "n" output signals are thus produced in parallel; and each such signal corresponds to an individual line of frame information.

Both of the above-described readout methods have significant drawbacks: In serial line readout (FIG. 2), the maximum frame rate obtainable is limited by the maximum data rate at which the individual sensor rows can be read out. If the shortest time in which a row can be read out is $\tau$, it will take a minimum of $n\tau$ (n being the number of rows in the area image sensor) to read out one frame of information. This translates into a maximum frame rate of 1 frame/$n\tau$. With the parallel line readout method (FIG. 3), a frame rate of 1 frame/$\tau$ is theoretically obtainable because all n rows are read out simultaneously. This n-fold increase in sensor frame rate is obtained at the expense of having to process n signals in parallel, a task which becomes progressively more difficult as the number of photosite rows increases.

Figure 4:
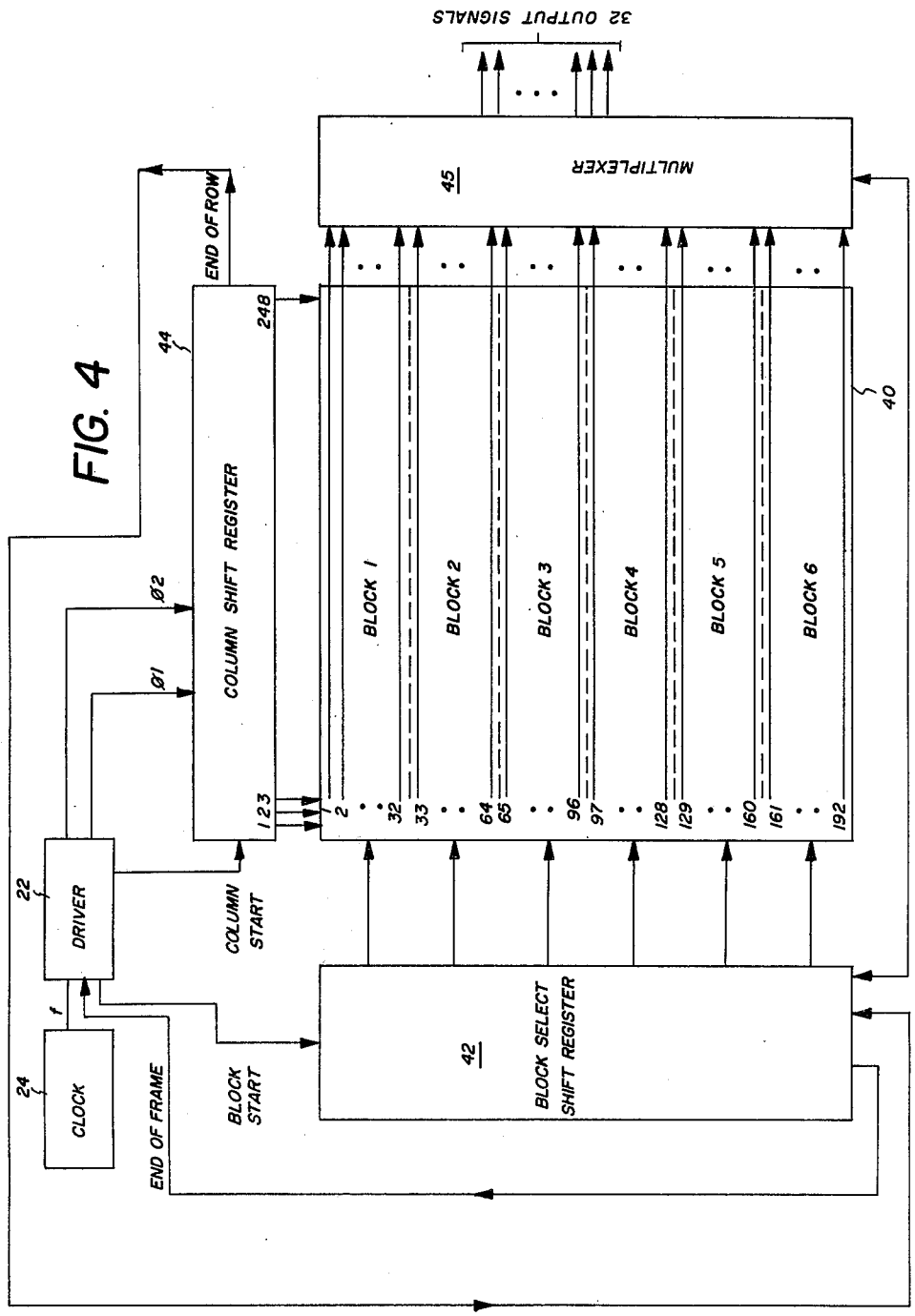
FIGS. 4 and 5 illustrate the block readout concept of the present invention.

In accordance with the present invention, a technique for sensor readout is provided in which the frame rate is increased dramatically over that obtainable with the serial line readout method. Moreover, such technique reduces the number of signals that must be identically processed to a fraction of the number resulting from the parallel line method of sensor readout. The underlying concept of the present invention is illustrated in FIG. 4 which shows a monochromatic area image sensor 40 (i.e., the photosites are sensitive to the same wavelength range of radiation) that is comprised of an array of photosites arranged in 192 horizontal rows and 248 vertical columns. Each photosite is readable upon the application thereto of an enablement signal and an address signal. In accordance with the invention, the sensor 40 is read as though divided into blocks. As depicted in FIG. 4, the sensor 40 is formatted into six blocks (1 through 6) of 32 photosite rows each. To begin readout, a block select electronic circuit in the form of a shift register 42 enables all 32 rows of block 1 for readout. Column address electronics, in the form of a column shift register 44, then sequentially addresses the photosite columns of the entire area image sensor 40. Since only the block 1 photosite rows (rows 1-32) have been enabled, however, only the rows of block 1 are actually read out. (The photosites in the not-enabled blocks are unaffected by the readout of rows 1-32, and continue to integrate charge in response to incident radiation.) After all columns have been addressed, an "end of row" signal from the column shift register 44 causes the block select shift register 42 to enable the block 2 photosite rows, leaving all other blocks in a not-enabled state. Column readout then proceeds as described for the block 1 photosite rows. This process is repeated until all six blocks of photosite rows are read out, at which time an "end of frame" signal from the block select shift register 42 resets the driver 22 for readout of the next frame. A multiplexer 45 reduces the number of active output lines from 192 to 32, the output signal appearing on the 32 active output lines corresponding to the 32 photosite rows being read out.

The frame information produced as described immediately above is in neither the parallel nor the serial line format discussed previously: The block information is produced in series; and each block within the series contains 32 signals arranged in parallel which correspond to the photosite rows in the respective blocks. By means of such a format, reduction in the time required for sensor readout by a factor equal to the number of photosite rows in a block is provided. Thus, a 192-row sensor that can be read out at a maximum frame rate of, say, 60 frames per second using a prior art readout method can, by means of the above-described inventive format, be read at a rate of 1920 frames per second, i.e., $32 \times 60 = 1920$.

Figure 5:
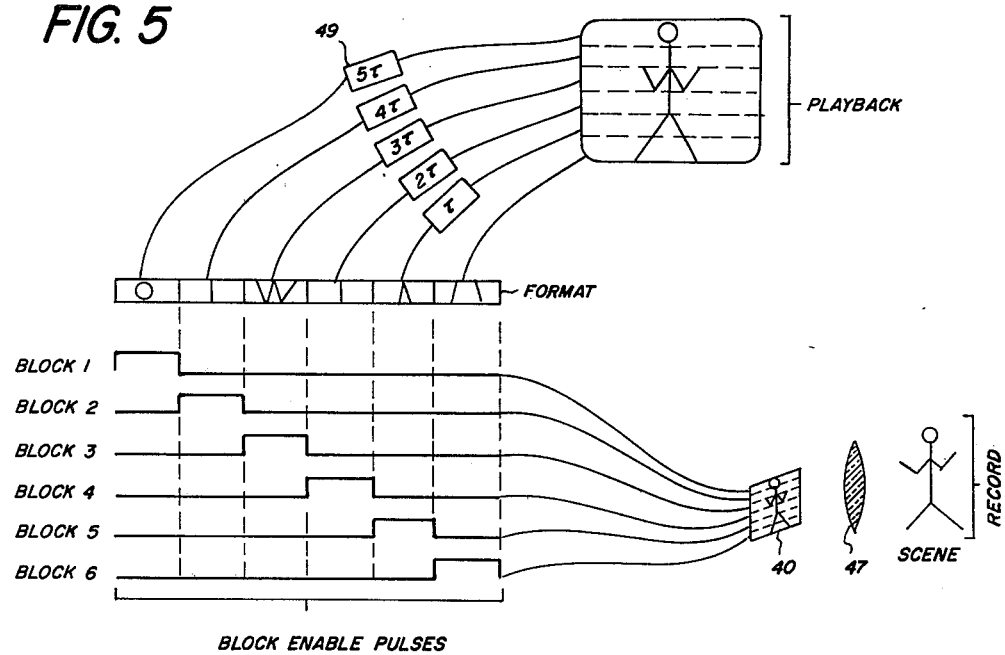

FIG. 5 illustrates, graphically, how frame information is formatted and recombined according to the invention to form a video display. A scene, imaged by an optical system 47 onto the area image sensor 40, is "sampled" by block enable pulses. As will be noted, the frame information (labelled FORMAT) corresponding to each block is shown in "pictorial form" directly above its respective block enable pulse. And, by the use of appropriate delay circuits 49, the blocks of information are recombined to form the complete playback video display.

Figure 6:
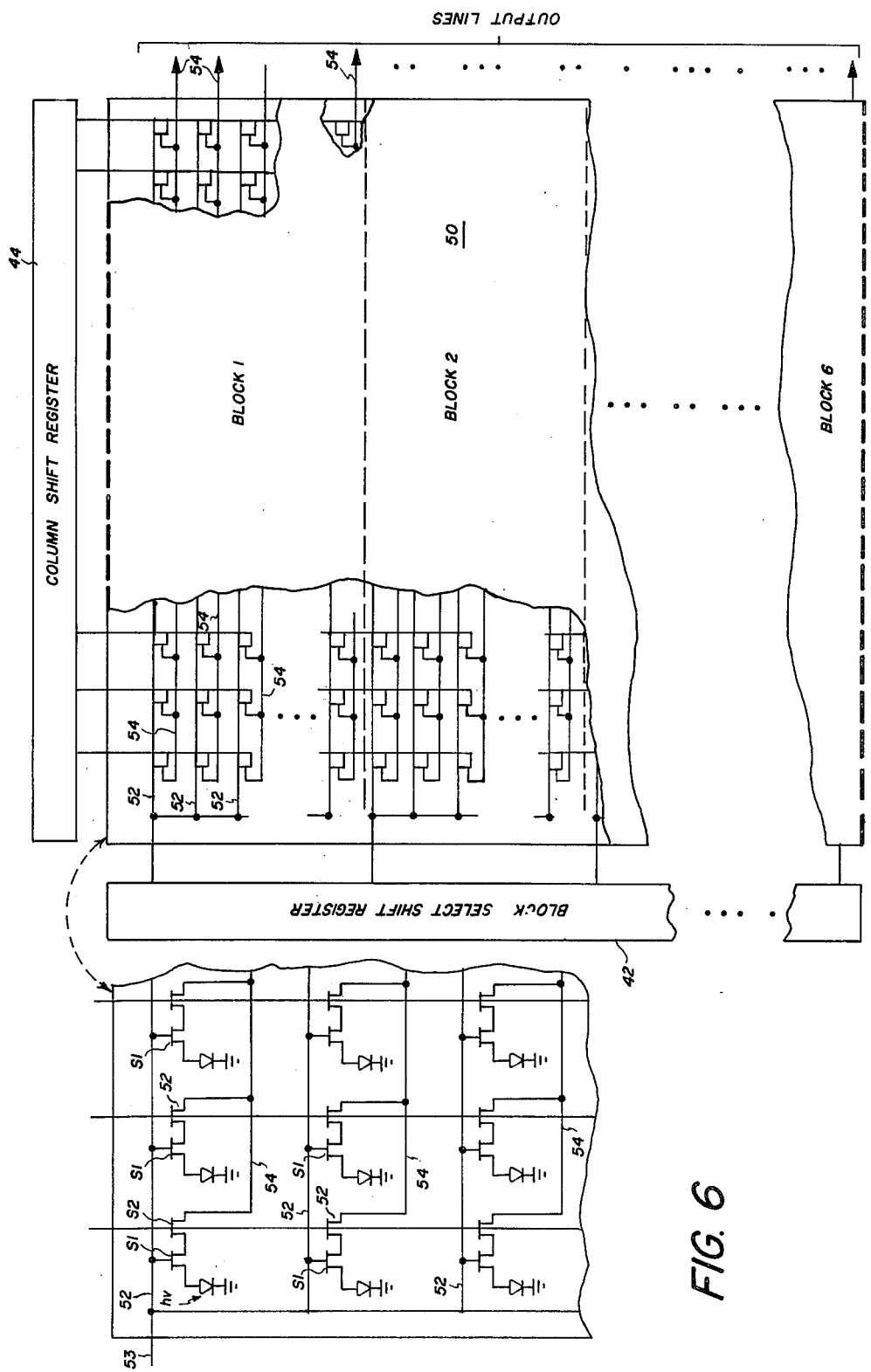
FIGS. 6 and 7 show, respectively, how the area image sensors shown in FIGS. 2 and 3 can be modified for block readout in accordance with the invention.

FIG. 6 shows a specific example of an area image array 50 (and a corresponding electrical schematic diagram) that is read out in blocks in accordance with the present invention. (The electrical circuitry for operating the column shift register 44 and block select shift register 42 is not shown, it being similar to that shown in FIG. 4.) Referring first to the electrical schematic diagram, each photosite includes two gates S1 and S2. Each gate S1 in a photosite row is connected to a block select bus line 52 for that row, and all block select bus lines 52 of a block are connected in common to a single block enable bus line 53. The block select shift register 42 enables a block of photosite rows for readout by applying an enablement signal to the block enable bus line 53, thereby setting each gate S1 within the enabled block to its closed state. All photosite rows in an enabled block are then column-wise read out simultaneously as the column shift register 14 sequentially addresses the photosite columns. As each column is addressed, the gates S2 within the addressed column are closed, thereby causing signals from respective photosites which are both enabled and column-addressed to be applied to respective read channels 54 common to all photosites in the given rows.

Figure 7:
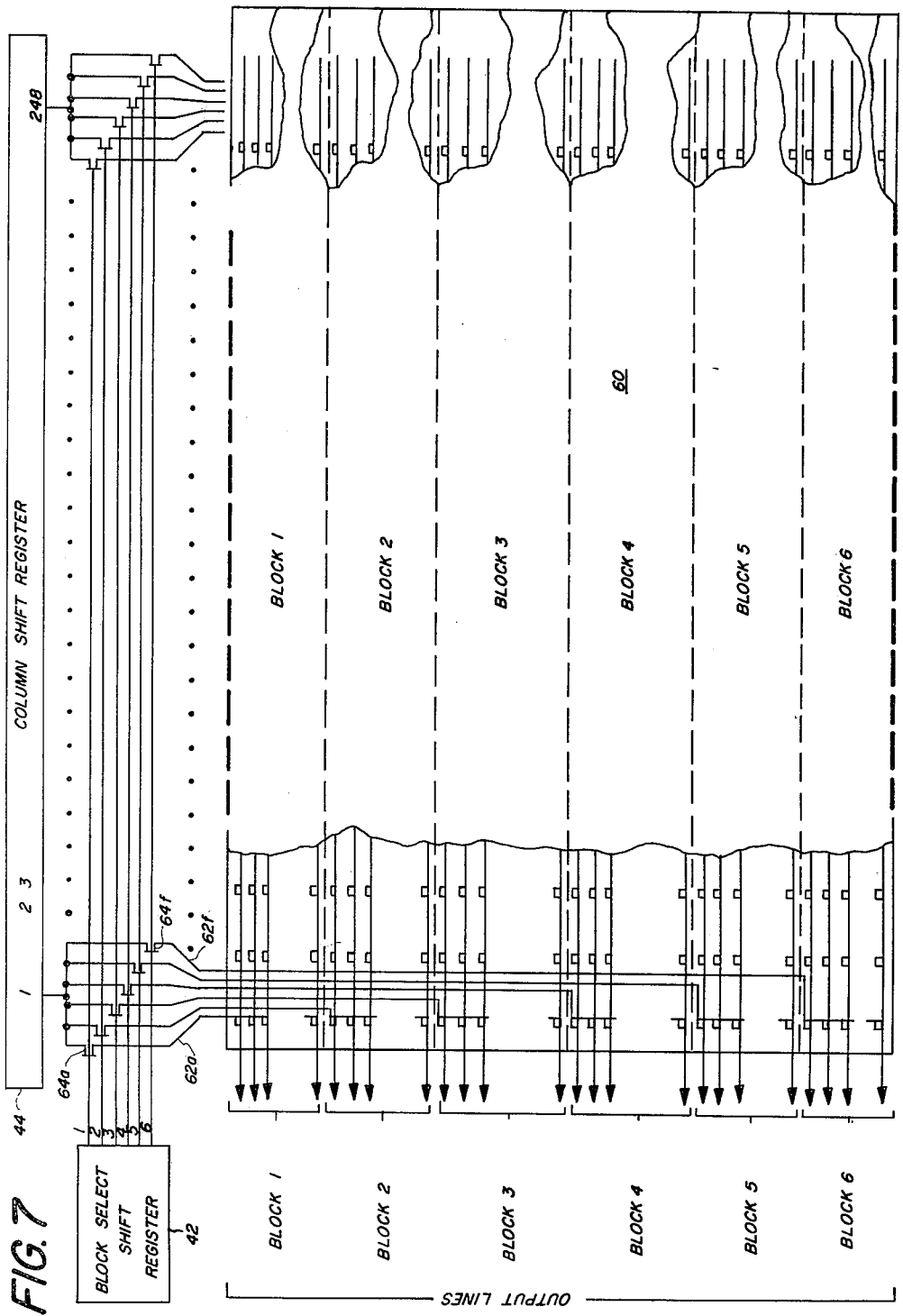

A second form of sensor 60 that is read out in blocks is shown in FIG. 7: The electrical schematic diagram of individual photosites is the same as is shown in FIG. 3. (The electrical circuitry for operating the column shift register 44 and block select shift register 42 is again not shown, it being similar to that shown in FIG. 4.) Each output terminal of the column shift register 44 is connected to respective groupings of six column address bus lines 62a-f through respective groupings of block select gates 64a-f; and the six outputs of the block select shift register 42 are connected to respective block select gates 64a-f associated with the respective sensor columns. The respective groupings of column address bus lines 62a-f are used to address the photosites in the blocks 1-6. (For clarity, the bus line structure is shown only for the first and last columns, it being understood that each column of photosites has a corresponding bus line structure for column address.)

To enable the block 1 photosite rows, the block select shift register 42 produces an enablement signal that closes the gate 64a for each column of photosites. Column address by the column shift register 14 then results in column-wise readout of the photosite rows in block 1. The next block, block 2, is enabled as the block select shift register 42 closes the block select gate 64b for each photosite column. Column address by the column shift register 44 then causes the photosite rows within block 2 to be read out. This process continues for the readout of an entire frame of information, at which time the block select and column shift registers are reset for readout of the next frame.

Figure 8:
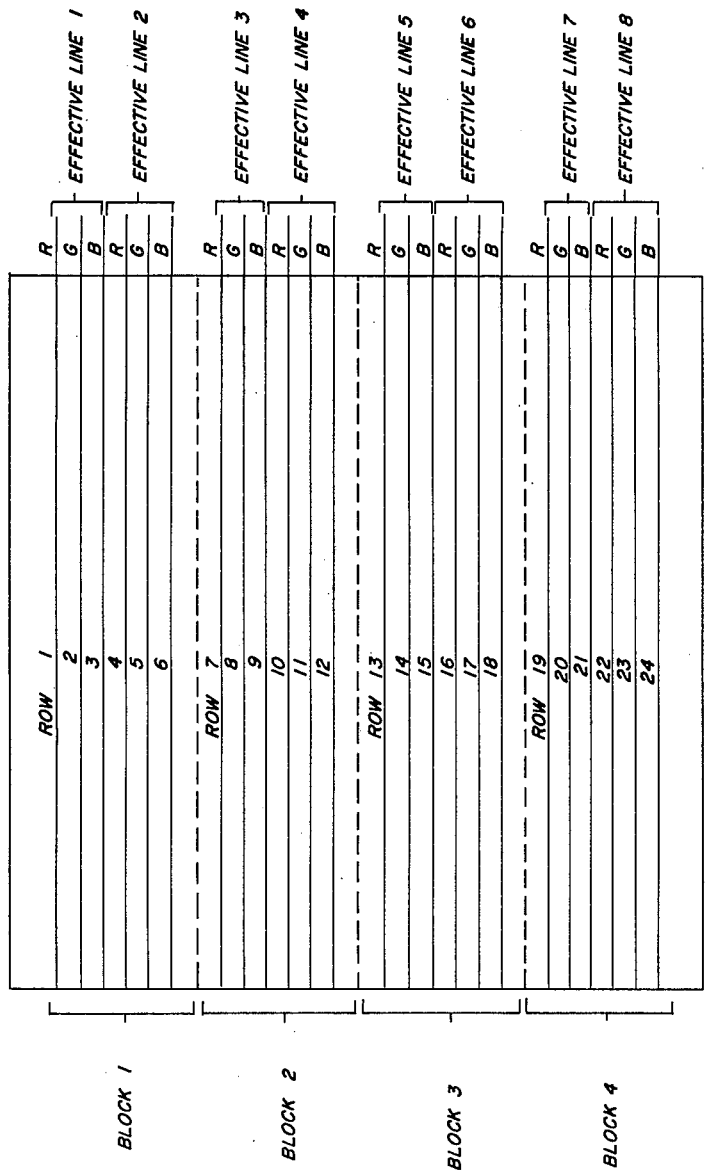
FIG. 8 illustrates block readout of a color area image sensor.

The block readout technique of the present invention is not limited to monochrome area image sensors. FIG. 8 shows a color area image sensor of a type disclosed in U.S. Pat. No. 4,117,510 wherein red, green and blue filters overlie respective rows of photosites. According to the readout method disclosed in U.S. Pat. No. 4,117,510, the red, green and blue signals from photosite rows 1, 2 and 3 are read out simultaneously and combined to give one effective line of resolution of a scene imaged on the sensor. Next, the red, green and blue signals from photosite rows 4, 5 and 6 are read out and combined to give a second effective line of resolution, and so on for the remaining photosite rows. By following the block readout technique of the present invention, the time required for sensor readout can be greatly reduced. In the illustrative example shown in FIG. 8, the sensor is divided, for purposes of readout, into four blocks, each block being comprised of two effective lines of resolution (six photosite rows) of a scene imaged on the sensor. In this example, sensor readout would take only one-half as long as the readout method taught in U.S. Pat. No. 4,117,510. In general, accelerated sensor readout is obtained by reading the sensor in blocks of photosites, wherein each block is comprised of a plurality of photosite rows that collectively represent two or more effective lines of resolution. For a three color system, such as described in connection with FIG. 8, each block of photosites will be comprised of six or more photosite rows because fewer photosite rows per block will not represent at least two effective lines of resolution.

Figure 9A:
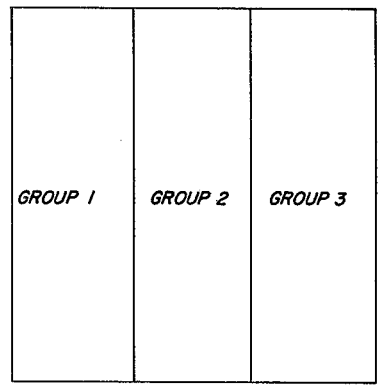
FIGS. 9a and 9b illustrate readout of an area image sensor by "groups" of photosites.
Figure 9B:
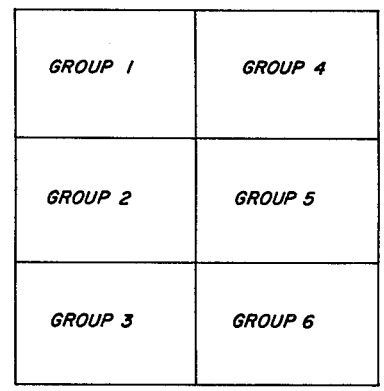

The invention has been described in detail with particular reference to certain preferred embodiments thereof, but it will be understood that variations and modifications can be effected within the spirit and scope of the invention. For example, the blocks of photosites need not be comprised of adjacent photosite rows but, rather, can be comprised of any plurality of photosite rows. Further, based on the above description of the invention, it will be apparent that a sensor containing an array of photosites can be read in subarrays of photosites, other than blocks comprised of a plurality of photosite rows. Such a subarray can be, for example, a grouping of photosites comprised of a plurality of portions of photosite rows wherein each of the photosite row portions is contiguous to another photosite row portion within the grouping. Two examples of sensor division into such "groups" are illustrated in FIGS. 9a and 9b. The designated "groups" of photosites are successively read out in a manner similar to that described above for block readout. A subarray can also take the form of a matrix of photosites, some or all of which photosites are not adjacently disposed.

What is claimed is:
1. Area image sensor apparatus comprising:
  (a) an array of photosites arranged in rows thereof, each of said photosites being responsive to the same wavelength of radiation; and
  (b) means for reading out said photosite array in blocks of photosites wherein a plurality of said blocks are each comprised of a respective plurality of photosite rows that collectively represent two or more effective lines of resolution of a scene imaged upon said array of photosites, and wherein said reading means is effective to cause parallel readout of the photosite rows within each block to produce an output signal comprised of blocks of information in a serial format with each block of information being comprised of a plurality of row signals in a parallel format, thereby reducing the time required for sensor apparatus readout to a fraction of the time required were the sensor apparatus read out one row at a time.

2. Apparatus as claimed in claim 1 wherein each block of photosites is comprised of an equal plurality of photosite rows, thereby reducing the time required for sensor apparatus readout, relative to row-by-row readout, by a factor equal to the number of photosite rows in a block.

3. Apparatus as claimed in claim 1 wherein:
each of said photosites is of a type that is readable upon the application thereof of an enablement and an address signal; and
said photosite reading means is comprised of block select electronics for sequentially applying an enablement signal to respective blocks of photosites, and address electronics for selectively applying an address signal to photosites within an enabled block to effect readout of enabled blocks of photosites.

4. Apparatus as claimed in claim 1 wherein:
said photosites are arranged in rows and columns;
each of said photosites is of a type that is readable upon the application thereto of an enablement and an address signal; and
said photosite reading means is comprised of block select electronics for sequentially applying an enablement signal to respective blocks of photosites, and a column address shift register for repeatedly applying an address signal to said columns of photosites to effect column-wise readout of said blocks of photosites as each of said blocks is sequentially enabled.

5. Monochromatic area image sensor apparatus comprising:

(a) an array of photosites arranged in rows thereof, each of said photosites being of a type that is sensitive to the same wavelength range of radiation; and (b) means for reading out said photosite array in blocks of photosites wherein each block is comprised of a plurality of photosite rows, and wherein said reading means is effective to cause parallel readout of the photosite rows within each block to produce an output signal comprised of blocks of information in a serial format with each block of information being comprised of a plurality of row signals in a parallel format, thereby reducing the time required for sensor apparatus readout to a fraction of the time required were the sensor apparatus read out one row at a time.

6. Apparatus as claimed in claim 5 wherein said blocks of photosites are comprised of a plurality of adjacent photosite rows.

7. Apparatus as claimed in claim 6 wherein said blocks of photosites are comprised of an equal plurality of photosite rows, thereby reducing the time required for sensor apparatus readout, relative to row-by-row readout, by a factor equal to the number of photosite rows in a block.

8. Apparatus as claimed in claim 5 wherein:
each of said photosites is of a type that is readable upon the application thereto of an enablement and an address signal; and
said photosite reading means is comprised of block select electronics for sequentially applying an enablement signal to respective blocks of photosites, and address electronics for selectively applying an address signal to photosites within an enabled block to effect readout of enabled blocks of photosites.

9. Monochromatic area image sensor apparatus comprising:
an array of photosites arranged in rows and columns, each of said photosites being of a type that is sensitive to the same wavelength range of radiation;
block select electronics for sequentially enabling respective blocks of photosites for readout, each of said blocks being comprised of a plurality of adjacent photosite rows; and
a column address shift register for addressing said columns of photosites to effect simultaneous column-wise read-out of the photosite rows within each block of photosites upon enablement to produce an output signal comprised of blocks of information in a serial format with each block of information being comprised of a plurality of row signals in a parallel format.

10. Area image sensor apparatus comprising:
(a) an array of photosites arranged in rows thereof; and
(b) means for reading out said photosite array in blocks of photosites wherein each block is comprised of a plurality of photosite rows and at least two of said rows contain photosites of a type that is sensitive to the same wavelength range of radiation, and wherein said reading means is effective to cause parallel readout of the photosite rows within each block to produce an output signal comprised of blocks of information in a serial format with each block of information being comprised of a plurality of row signals in a parallel format, thereby reducing the time required for sensor apparatus read-out to a function of the time required were the sensor apparatus read out one row at a time.

11. Apparatus as claimed in claim 10 wherein each block of photosites is comprised of an equal plurality of photosite rows, thereby reducing the time required for sensor apparatus readout, relative to row-by-row readout, by a factor equal to the number of photosite rows in a block.

12. Apparatus as claimed in claim 10 wherein:
said photosites are arranged in rows and columns;
each of said photosites is readable upon the application thereto of an enablement and an address signal; and
said photosite reading means is comprised of block select electronics for sequentially applying an enablement signal to respective blocks of photosites, and column address electronics for repeatedly applying an address signal to said columns of photosites to effect column-wise readout of each block of photosites as that block is enabled.

13. Area image sensor apparatus comprising:
(a) an array of photosites arranged in rows thereof; and
(b) means for reading out said photosite array in blocks of photosites wherein a plurality of said blocks are each comprised of at least six rows of photosites, and wherein said reading means is effective to cause parallel readout of the photosite rows within each block to produce an output signal comprised of blocks of information in a serial format with each block of information being comprised of a plurality of row signals in a parallel format.

14. Apparatus as claimed in claim 13 wherein each of the plurality of blocks of photosites is comprised of an equal plurality of photosite rows.

15. Apparatus as claimed in claim 13 wherein:
said photosites are arranged in rows and columns;
each of said photosites is readable upon the application thereto of an enablement and an address signal; and
said photosite reading means is comprised of block select electronics for sequentially applying an enablement signal to respective blocks of photosites, and column address electronics for selectively applying an address signal to said column of photosites to effect column-wise readout of enabled blocks of photosites.

16. A method of reading out an area image sensor containing an array of photosites arranged in rows and columns, each of said photosites being responsive to the same wavelength of radiation and being of a type that is readable upon the application thereto of an enablement and an address signal, said method comprising the steps of:
sequentially applying an enablement signal to respective blocks of photosites, each of said blocks being comprised of a plurality of adjacent rows of photosites that represent at least two effective lines of resolution of a scene imaged upon said array of photosites; and
applying an address signal to said columns of photosites to effect simultaneous column-wise readout of the photosite rows within said blocks of photosites as each block is enabled to produce an output signal comprised of blocks of information in a serial format with each block of information being comprised of a plurality of row signals in a parallel format.

17. A method of reading out an area image sensor containing an array of photosites arranged in rows and columns, each of said photosites being of a type that is readable upon the application thereto of an enablement and address signal, and each of said photosites being of a type that is sensitive to the same wavelength range of radiation, said method comprising the steps of:
sequentially applying an enablement signal to respective blocks of photosites, each of said blocks being comprised of a plurality of adjacent rows of photosites; and
applying an address signal to said columns of photosites to effect simultaneous column-wise readout of the photosite rows within said blocks of photosites as each block is enabled to produce an output signal comprised of blocks of information in a serial format with each block of information being comprised of a plurality of row signals in a parallel format.

* * * * *

UNITED STATES PATENT AND TRADEMARK OFFICE
CERTIFICATE OF CORRECTION

PATENT NO. : 4,322,752
DATED : March 30, 1982
INVENTOR(S) : James A. Bixby

It is certified that error appears in the above-identified patent and that said Letters Patent are hereby corrected as shown below:

Column 8, line 36, "function" should read --fraction--.
Column 9, line 13, "column" should read --columns--.

Signed and Sealed this

Thirteenth Day of July 1982

[SEAL]

Attest:

GERALD J. MOSSINGHOFF

Attesting Officer    Commissioner of Patents and Trademarks